Oct. 21, 1958 D. B. PRICE 2,856,844
BEVERAGE BREWING APPARATUS
Filed Jan. 17, 1957
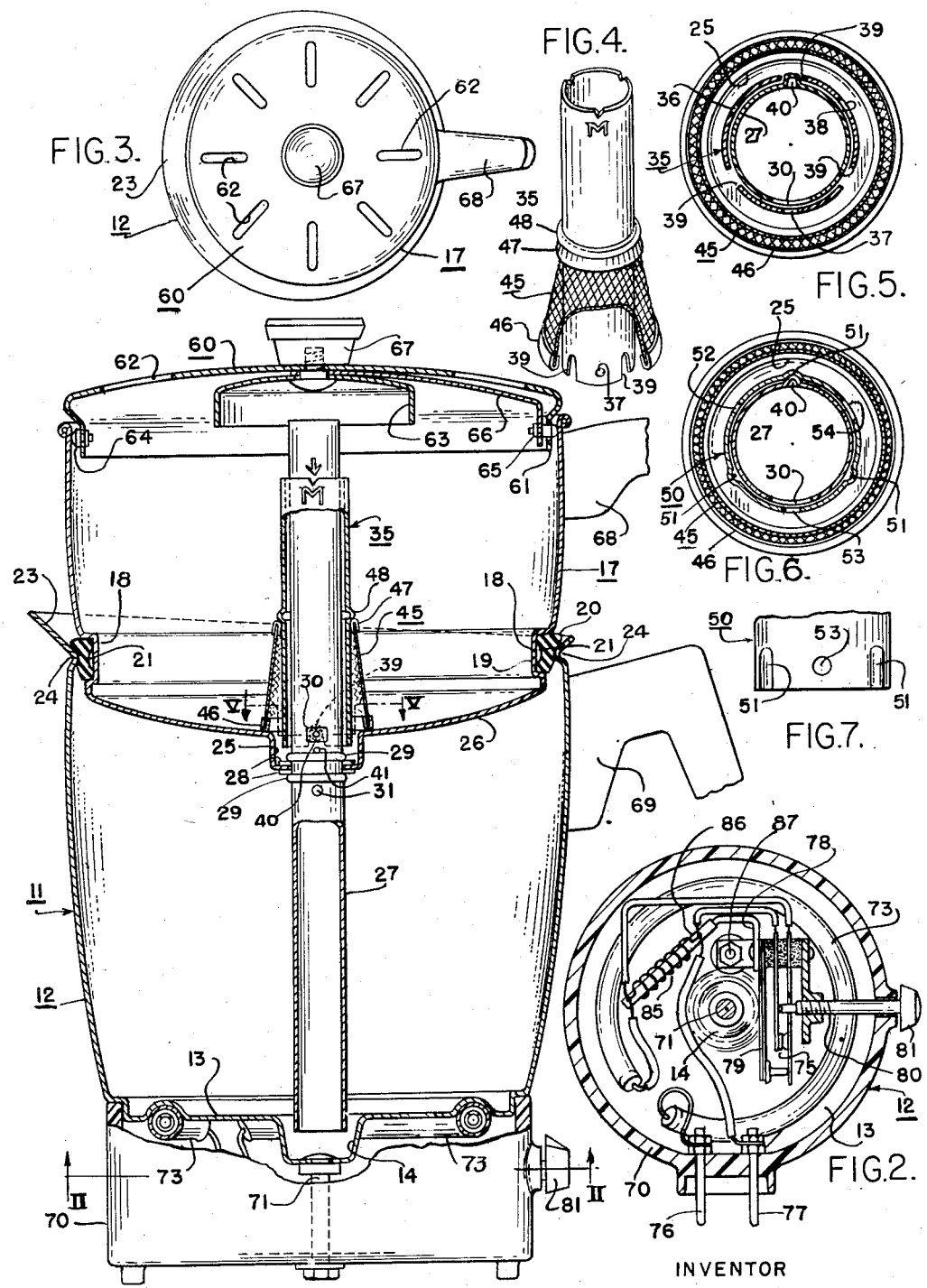
INVENTOR
DAVID B. PRICE
BY M. C. Freudenberg
ATTORNEY

United States Patent Office 2,856,844
Patented Oct. 21, 1958

2,856,844

BEVERAGE BREWING APPARATUS

David B. Price, Mansfield, Ohio, assignor to Westinghouse Electric Corporation, East Pittsburgh, Pa., a corporation of Pennsylvania Application January 17, 1957, Serial No. 634,671

2 Claims. (Cl. 99—299)

This invention relates to an improved beverage brewing device for making coffee, tea or the like from solids having water soluble essences therein. More particularly this invention relates to an improved brewing device in which the strength of the brew may be adjustably controlled by controlling the period of steeping and in which the solids from which the flavoring essences are extracted remain separated from the brew at the end of the brewing operation.

It is an object of this invention to provide an improved beverage brewing device with improved means for controlling the steeping time.

It is another object of this invention to provide an improved brewing device in which steeping takes place in a vessel other than the serving vessel and in which the steeping time may be readily adjusted.

Another object of this invention is to provide, in a brewing device of the above type, an improved filter and return flow metering control arrangement.

It is another object of this invention to provide an improved seal between the serving and steeping vessels in a brewing device of the above type.

In accordance with this invention, a beverage brewing device comprises a main open-top heating and serving vessel having a steeping vessel supported thereabove in sealed relationship therewith. The steeping vessel has a liquid transfer tube extending through the bottom wall thereof and down into a small well in the bottom of the main vessel, the upper end of this tube being disposed near the top of the steeping vessel. Liquid heated in the main vessel is forced upwardly by pressure therein through the transfer tube and into the steeping vessel, wherein the liquid extracts soluble essences from the solids therein. The transfer tube has a small vent opening therein just below the bottom wall of the steeping vessel to control the pressure in the main vessel during a brewing operation. The heating vessel is provided with heating means and adjustable controls therefor to automatically reduce the heat supplied thereto after the liquid is forced from the lower vessel to the steeping vessel. The liquid then returns by gravity through a drain opening in the transfer tube at a rate determined by adjustment of a metering tube disposed about the transfer tube within the steeping vessel. A filter screen is disposed about the drain opening and metering tube to prevent clogging.

The foregoing and other objects are effected by the invention as will be apparent from the following description and claims taken in connection with the accompanying drawings, forming a part of this application, in which:

Fig. 1 is a vertical section of a beverage brewing device with the base shown partially cut away;

Fig. 2 is a horizontal section taken on line II—II of Fig. 1 and showing the heating and control apparatus for the brewing device;

Fig. 3 is a plan view of the brewing device with the cover in place.

Fig. 4 is a perspective view of a metering tube and screen removed from the brewing device;

Fig. 5 is an enlarged horizontal section taken on line V—V of Fig. 1;

Fig. 6 is a horizontal section similar to Fig. 5 but showing details of a second embodiment of the invention; and Fig. 7 is a side elevation of the lower end of the metering tube shown in Fig. 6.

Referring to Fig. 1 of the drawings, the beverage brewing device 11 of six cup capacity comprises a main metal heating vessel 12 having a generally flat bottom wall 13 with a well 14 disposed centrally therein. The heating vessel has a large open top into which extends the lower end of a bowl-shaped metal steeping vessel 17. The vessels 12 and 17 may be formed of aluminum or other suitable material. The lower end of the steeping vessel 17 has in the outwardly facing side wall thereof a shallow annular groove 18 within which is disposed a resilient gasket 20 of rubber material or the like, providing a seal between the vessels 12 and 17. The groove 18 has a flat, generally cylindrical, vertically-extending wall 19 which supports the inside face of the gasket. The gasket 20 has a tapered vertical cross section which is wider at the top and has a generally frusto-conical outer surface. The inner gasket face abuts vertically spaced top and bottom portions of the wall 19, the center of this inner gasket face having an annular recess 21 forming a space between the gasket 20 and the wall 19. This space enables the gasket to be deformed to make a better seal when its outer surface is engaged by part of the main heating vessel 12. The upper end of the heating vessel 12 is formed with a pouring lip 23 and has a sharp bead 24 of very small radius in vertical section formed just below the lip 23. The bead 24 extends inwardly to deform the outer surface of the gasket 20 to form a tight seal and support the gasket and the steeping vessel 17 therefrom.

A vertically extending liquid transfer tube 27, open at both ends, is secured in a hole at the bottom of a centrally disposed well 25 in the bottom wall 26 of the steeping vessel 17. The tube 27 is made of aluminum and is secured by means of stainless steel reinforcing washers 28 disposed around the tube on opposite sides of the vessel wall 26 with beads 29 formed on the tube 27 clamping the washers 28 against the vessel wall. The lower end of the transfer tube 27 extends into the well 14 in the bottom of the heating vessel 12 when the steeping vessel 17 is supported in the latter. The upper portion of the transfer tube 27 extends to a level near the top of the steeping vessel 17. The tube 27 is provided with a large drain opening 30 within the steeping vessel near the bottom wall 26 and within the well 25. A second opening 31 in the tube 27 is provided just beneath the bottom wall 26 of the steeping vessel to control the pressure within the lower vessel 12 during a brewing operation.

A metal metering tube 35 encircles the portion of the liquid transfer tube 27 within the steeping vessel 17. The lower end of this metering tube is provided with a plurality of circumferentially spaced openings 36, 37 and 38 of different sizes, which may be selectively positioned opposite the drain hole 30 in the transfer tube 27. The lower end of the metering tube is also provided with indexing means comprising a plurality of slits 39, any one of which may be placed with its sides straddling a nodule or boss 40 on the transfer tube 27 diametrically opposite the drain opening 30 therein in order to register one of the openings in the metering tube 35 with the drain hole 30. The openings 36, 37 and 38 in the metering tube are of three different sizes, small, medium and large, respectively, to provide strong, medium and weak brew, respectively. The smallest hole 36 is of such size as to restrict the flow of liquid through the drain opening 30 and increase the steeping time, or length of time that liquid is retained in the steeping vessel, relative that steeping time which occurs when the large hole 38 is disposed opposite the drain opening 30. The drain opening 30 is located in the well 25 in the bottom wall 26 of the steeping vessel 17 to reduce the amount of liquid remaining in the latter after a brewing operation. The tube 35 has a small opening 41 below the drain opening 30 within the upper vessel to even further reduce the amount of liquid remaining in the bottom of the latter after a brewing operation.

Although the metering tube 35 fits rather closely around the transfer tube 27, there may be some liquid leakage under the end of the metering tube to the drain opening 30. This leakage will vary little regardless which of the openings 36, 37 and 38 is in registry with the drain opening 30 and may be taken into consideration, along with the leakage through the opening 41, in determining the sizes for the openings 36, 37 and 38. The return or drain flow rate from the upper vessel is preferably such that for strong brew with opening 36 disposed opposite the drain opening 30 the steeping period for a six cup load will be approximately five minutes after the entire body of liquid is transferred to the steeping vessel. For weak strength brew this steeping time may be of the order of two and one-half minutes.

A metal screen 45 of generally frusto-conical configuration encircles the lower end of the metering tube 35 and the openings therein to keep coffee grounds or tea leaves away from the drain opening 30. The screen has a collar 46 crimped about the lower edge thereof and resting on the bottom wall 26 of the steeping vessel 17. A similar but smaller collar 47 is formed at the top of the screen and fits closely about the metering tube 35 just beneath a bead 48 on the latter. This bead 48 supports the metering tube 35 on the screen 45 so that the entire weight of the tube 35 may be used to keep the screen seated on the bottom wall 26 of the steeping vessel 17. The perforate wall of the screen is inclined very substantially, almost vertically, with respect to the horizontal steeping vessel wall 26 and extends a substantial distance thereabove to prevent tea leaves or other solid matter from matting there-against and restricting liquid flow when the liquid is drained from the steeping vessel 17 during a brewing operation.

An alternative construction for indexing a metering tube 50 is shown in Figs. 6 and 7. In this modification, longitudinally extending indexing notches or grooves 51 inside the lower end of the tube 50 are formed by embossing the wall thereof outwardly. Any one of the grooves 51 may be selectively positioned over the boss 40 on the transfer tube 27 for registering one of the different sized metering orifices 52, 53 or 54 with the drain opening 30 in the transfer tube. These bosses formed by the grooves 51 also function to prevent removal of the screen 45 from the metering tube 50 after the screen and tube assembly is removed from the steeping vessel 17, but allow the screen 45 to be slid toward the lower end of the tube to facilitate cleaning the interior of the screen. Except for the change in the indexing means described above, the metering tube of Figs. 6 and 7 is identical to that shown in the other figures of the drawing and functions in the same manner.

A cover 60 is shown disposed on the upper or steeping vessel 17 in Figs. 1 and 3. After a brewing operation, the cover 60 may be removed from the steeping vessel 17 and used as a cover for the main vessel 12 after the steeping vessel is removed therefrom. The upper face of the cover 60 is provided with a plurality of slots or openings 62 through which the brew may flow when served from the heating vessel 12 by tipping the latter. An inverted deflecting cup 63 is disposed inside the cover above the transfer tube 27 to prevent liquid which is pumped upwardly through the transfer tube during a brewing operation from flowing out through the openings 62 in the cover 60.

The cover 60 has a downwardly projecting peripheral flange 61 which extends into the top of either supporting vessel. A plurality of circumferentially spaced plastic or nylon buttons 64 and 65 are supported around the outside of the flange to engage the upper side wall of the steeping vessel 17 or to snap over the bead 24 on the lower vessel to hold the cover 60 in place. The button 64 is secured directly to the flange, whereas the button 65 is fastened to the end of a spring arm 66 and extends outwardly through a hole in the flange 61. The spring arm 66 is sufficiently resilient to permit the button 65 to be deflected relative the button 64. One end of this arm 66 is clamped between the cup 63 and the cover 60 by a screw threaded in a knob 67 and holding these several elements together. This cover assembly may be readily disassembled for cleaning. The upper and lower vessels may be provided with suitable handles 68 and 69, respectively.

The outside of the bottom wall 13 of the heating vessel 12 is covered by a cup-shaped, thermally insulating, base 70 of phenolic or other molded material. The base is secured to the vessel 12 by means of a single stud 71 secured, as by spot welding, to the bottom of the well 14 and extending through a central opening in the bottom of the base 70. A nut threaded on the lower end of this stud 71 on the outside of the base 70 firmly clamps the later to the vessel 12. Attached to the bottom wall 13 of the vessel 12 and encircling the well 14 within the base 70 is a sheathed electrical resistance heating element 73 rated at approximately 750 watts and usually energized at 115 volts.

A thermostatically actuated switch 75 is secured to the bottom wall 13 of the vessel 12 between the well 14 and the heater 73 and is connected in series with the heater 73 between a pair of terminals 76 and 77. The terminals 76 and 77 are fixed to the base for receiving a conventional female plug on an appliance cord (not shown). The switch 75 is supported by a bracket 78 secured in good heat conducting relationship to the bottom wall of the vessel. A bimetal strip 79 is supported by the bracket 78 in good heat transfer relationship therewith and with the bottom wall of the vessel. The bimetallic strip 79 actuates the switch 75 to open the contacts thereof at a predetermined temperature of the strip 79. The switch opening temperature may be manually varied over a range of approximately 150° to 235° by means of a contact adjusting screw 80 and control knob 81 therefor. The function of this adjusting means will be explained hereinafter.

A low wattage warming heater 85 is supported adjacent the bottom wall 13 of the main vessel to keep brew therein warm after a brewing operation is completed. The warming heater 85 is supported by a heat conducting arm 86 of the supporting bracket 78 so that heat may be readily conducted from this heater through the bracket of the bimetal strip 79 for a purpose described hereinafter. The heater 85 is connected to be shunted by the contacts of switch 75 when they are closed. When the switch 75 is open, the warming heater 85 and main heater 73 are energized in series between the terminals 76 and 77 with a total wattage of 55 watts, most of which is provided in the heater 85. The bracket 78 is attached to the bottom wall of the vessel by means of a nut threaded on single heat conducting stud 87 brazed or welded to the bottom wall 13 to facilitate replacement of the thermostatic switch and warming heater, if necessary.

Operation

To perform a brewing operation with the brewing device described above, the user will fill the lower vessel 12 with a predetermined quantity of water and then insert the upper vessel in place, as illustrated in Fig. 1. The screen 45 and metering tube 35 are then slipped over the upper end of the liquid transfer tube 27 with the metering tube 35 adjusted to give a predetermined brew strength. The metering tube 35 is provided with indicia at its upper end which may be positioned relative a fixed mark on the upper end of the transfer tube 27 to indicate the size of the metering orifice disposed opposite the drain opening 30. The tea leaves or ground coffee from which the essence is to be extracted is then placed in the steeping vessel 17 around the screen 45 and the cover is placed in position. The thermostatic switch 75 is adjusted to open at a temperature above boiling for a brewing operation to be performed and the terminals 76 and 77 are then connected to a power source.

The sheathed heater 73 will be energized continuously until the water in the lower vessel 12 boils and builds up sufficient pressure to force the water therein down through the well 14 and up the transfer tube 27 into the upper vessel 17. The vent opening 31 in the transfer tube beneath the upper vessel prevents the building up of pressure in the lower vessel before the water therein reaches boiling. The opening 31 also acts as a pressure relief during the rapid rise in pressure after boiling takes place, but maintains sufficient pressure to force the water rapidly to the upper vessel.

As the water passes into the upper vessel 17 from the lower vessel 12, the water level in the latter will gradually drop down into the well, whereupon the temperature of the bottom wall 13 of the lower vessel near the heater will rise above boiling, heating the bimetal strip 79 to open the contacts of the switch 75. Upon separation of these contacts, the low wattage warming heater 85 will be energized in series with the main heater 73 to substantially reduce the heat output from this circuit. The arm 86 of the bracket 78 on which the warming heater 85 is supported conducts heat directly from heater 85 to the bimetal 79 to keep the latter sufficiently warm to maintain the contacts of the switch 75 separated. The warming heater 85 also supplies enough heat adjacent the bottom wall 13 of the vessel 12 to keep the liquid contents thereof warm after they drain back from the upper vessel 17.

Upon reducing the amount of heat supplied to the lower vessel 12 in response to opening of the switch 75, the water in the steeping vessel 17 will be permitted to drain back to the lower vessel 12 through the drain opening 30 and the associated opening in the metering tube 35. The rate at which this liquid flows back, and consequently the duration of steeping, is dependent upon the size of the opening disposed opposite the drain opening. The vent opening 31 maintains atmospheric pressure in the lower vessel during draining of liquid from the steeping vessel so that the return flow is caused only by gravity and is readily regulated by the metering tube 35. To serve the brew, the user need only then remove the cover 60 and the steeping vessel 17 from the heating vessel 12 and replace the cover on the heating vessel.

The lower vessel 12 may be used alone as a hot cup or bottle warming device in addition to its use with the steeping vessel 17 for brewing beverages. The thermostatic switch 75 may be adjusted over a wide range to permit the vessel contents to be heated by the main heater 73 to a predetermined temperature after which they may be kept warm with the warming heater 85. Although the knob 81 may change the thermostat setting in a range from about 150 degrees F. to a temperature well above the boiling point of water, it will be preferably set at the same temperature, approximately 230 degrees F., for each brewing operation to be performed as described above.

While the invention has been shown in several forms, it will be obvious to those skilled in the art that it is not so limited, but is susceptible of various other changes and modifications without departing from the spirit thereof.

What is claimed is:

1. A beverage brewing device comprising an open-top heating vessel, a steeping vessel having a bottom wall and supported above said heating vessel, a transfer tube extending through the bottom wall of said steeping vessel and anchored therein, the upper end of said transfer tube extending into an upper portion of the steeping vessel, the lower end of said tube extending near the bottom of the heating vessel, said tube having a drain opening within said steeping vessel near the bottom wall thereof, a metering tube encircling said transfer tube within said steeping vessel, said metering tube having a plurality of different size openings circumferentially spaced thereabout, said transfer tube having a nodule on the exterior thereof, said metering tube having a plurality of longitudinal grooves therein which may be selectively positioned by said nodule to fix the position of any one of said openings opposite said drain openings, said transfer tube having a small vent opening therein near the bottom wall of said steeping vessel and below the latter.

2. A beverage brewing device comprising an open-top heating vessel, an open-top steeping vessel supported by said heating vessel, a seal between said vessels, a liquid transfer tube extending through the bottom of said steeping vessel into said heating vessel with the lower end of said tube being disposed adjacent the bottom of the latter vessel, the upper end of said tube being disposed near the top of said steeping vessel, said tube having a drain opening in said steeping vessel near the bottom thereof, a metering tube concentric with said transfer tube on the outside of the latter and extending from a point near the bottom of said steeping vessel to a point above the normal liquid level therein, a boss formed on said transfer tube near the drain opening therein, a plurality of bosses formed on the lower end of said metering tube, the bosses on said tube being formed by longitudinally extending grooves on the inside of said tube, a plurality of different size liquid flow control openings in said metering tube near the bottom thereof, the boss on said transfer tube and the grooves in said metering tube forming indexing means to selectively locate any one of said flow control openings opposite the drain openings in said transfer tube, and a filter screen disposed about the lower end of said transfer tube, the lower end of said screen resting on the bottom of said steeping vessel, the upper end of said screen being provided with a collar closely encircling said metering tube, said metering tube having means including the bosses thereon to prevent removal of said screen from said tube.

References Cited in the file of this patent

UNITED STATES PATENTS

| | | |
|---|---|---|
| 2,021,293 | De Silva | Nov. 19, 1935 |
| 2,513,594 | Snyder | July 4, 1950 |
| 2,543,528 | Kaufmann | Feb. 27, 1951 |
| 2,675,754 | Huck | Apr. 20, 1954 |

FOREIGN PATENTS

| | | |
|---|---|---|
| 919,345 | France | Nov. 25, 1946 |

UNITED STATES PATENT OFFICE
CERTIFICATE OF CORRECTION

Patent No. 2,856,844                                October 21, 1958

David B. Price

It is hereby certified that error appears in the printed specification of the above numbered patent requiring correction and that the said Letters Patent should read as corrected below.

Column 4, line 31, for "later" read -- latter --; line 60, for "bracket of" read -- bracket to --.

Signed and sealed this 7th day of July 1959.

(SEAL)
Attest:
KARL H. AXLINE
Attesting Officer

ROBERT C. WATSON
Commissioner of Patents